Jan. 18, 1938.  H. STAKE ET AL  2,105,847
LABELING MACHINE
Filed Aug. 12, 1935  9 Sheets-Sheet 1

Fig.1

Inventors
HERMAN STAKE
AXEL W. CARLSON

By Edward H. Goodrich
Attorney

Jan. 18, 1938.  H. STAKE ET AL  2,105,847
LABELING MACHINE
Filed Aug. 12, 1935    9 Sheets-Sheet 3

Inventors
HERMAN STAKE
AXEL W. CARLSON

By Edward H. Goodrich
Attorney

Inventors
HERMAN STAKE
AXEL W. CARLSON
By Edward H. Goodrich
Attorney

Patented Jan. 18, 1938

2,105,847

UNITED STATES PATENT OFFICE 2,105,847

LABELING MACHINE

Herman Stake and Axel W. Carlson, Worcester, Mass.; said Stake assignor to said Carlson Application August 12, 1935, Serial No. 35,744

8 Claims. (Cl. 216—54)

This invention relates to labeling machines and more particularly to an automatic mechanism for individually coating labels with adhesive and thereafter applying them successively to the surfaces of bottles or other articles.

Heretofore, various devices have been utilized to apply labels to the surfaces of bottles. However, these mechanisms have proved cumbersome and expensive, as well as slow to operate. The usual construction of the prior types of labeling machines as employed for labeling bottles, comprises a pair of spaced pickers arranged to apply adhesive to the end portions of a label, remove said label from a holder and thereafter transport it to a desired position adjacent to the bottle whereupon a pivotally mounted device commonly referred to as a grip-finger is swung into angular engagement with the label between the pickers to strip it therefrom and secure it against the bottle. Suitable wiping devices mounted upon pivoted swinging arms thereafter are brought into engagement with the label to press the remaining portion thereof against the bottle and cause it to positively adhere in position.

Bottle labeling machines of this general type have many inherent defects. The grip-finger movement has frequently tended to misplace the label upon the bottle permitting a slippage thereon with the consequent result that the label was incorrectly and unevenly applied. This difficulty has proved both time wasting and expensive, particularly in view of the fact that it has necessitated a careful inspection of each bottle after the labeling operation and a removal of incorrectly applied labels after which the bottle had to be cleaned and again placed in the machine to go through another labeling operation. Furthermore, in these prior types of machines, any uneven slippage of the label as it is removed from the pickers usually results in a tearing of the label with the consequent result that it completely spoils the labeling operation. The prior types of wiping devices which served to press the label into position, have frequently engaged the label unevenly, resulting in the formation of air bells and creases which materially spoiled the general appearance of the label, as well as caused it to improperly adhere in position. It is a well known fact that if a label is not evenly coated with adhesive and thereafter uniformly applied to the surface to which it is to be attached, damp atmospheres will often loosen it and cause it to fall from position resulting in loss of identification of the contents of the bottle or container and making it unsalable.

It is, therefore the primary object of this invention to provide a labeling machine adapted to apply labels securely to objects in predetermined positions thereon without slippage or tearing.

It is a further object of this invention to provide a mechanism whereby a label may be uniformly secured to a surface under a predetermined tension.

It is a still further object of this invention to provide a mechanism arranged to tangentially engage a label and uniformly apply a portion thereof to a surface with a predetermined evenly distributed pressure and thereafter to wipe the remaining portions of the label into positive engagement with the article with a gradually increasing pressure.

Referring to the drawings, illustrating one embodiment of this invention, wherein like reference numerals indicate like parts.

In accordance with our invention, we have provided a machine which is arranged for automatically applying labels to successive articles, such as bottles, packages and the like. To accomplish this, spaced pickers are first automatically coated with a suitable adhesive such as a gum, and thereafter arranged to transfer a single label from a pack of labels within a magazine to a position adjacent to the article being labeled. A suitable pressure device such as a grip-finger, thereafter moves from a remote position into tangential engagement with the label adhering to the pickers, and serves to uniformly strip it from the pickers and evenly locate a central portion thereof in an initial position upon the article being labeled without slippage or tearing of the label. This is preferably accomplished by having the grip-finger approach the label and strip it from the pickers with a linear movement.

When the label has been initially located in position by the grip-finger, the pickers are removed from the labeling zone and a wiper mechanism engages the ends of the label and secures it in position with an ever-increasing pressure. The pickers are preferably pivotally mounted and arranged to be periodically given a coating of suitable adhesive by a transfer roll which moves relative thereto and transfers a uniform coating of adhesive thereon prior to each engagement of the pickers with the bottom of a pack of labels mounted within the magazine. After the wiper mechanism has suitably pressed the label into proper contact with the article, it moves from engagement therewith and the grip-finger is withdrawn to a remote position, whereupon the labeled article may be removed from labeling position in the machine and replaced with another article to be labeled. The various parts of the mechanism are arranged to move in timed relationship to each other and in proper sequence. We preferably control the operation of our machine by a plurality of cams in such manner that the various mechanisms thereof will be automatically timed with relation to each other and the machine will continue to operate through a repetitive cycle as long as desired.

Referring to our preferred type of invention as illustrated, we have shown a mechanism arranged to label a bottle 50 held within a bottle holder 51 secured to the machine frame. To accomplish this, each bottom label of two packs of labels held within the respectively spaced label holders 53 and 54 is engaged and simultaneously transferred by a suitable picker mechanism which preferably comprises two spaced oscillatory pickers 55 and 56 arranged to successively transfer labels from the packs to a position adjacent to the bottle. Prior to engagement of the pickers with both of said labels within the label holders, a transfer roller 58 is arranged to transfer and evenly spread a uniform coating of suitable adhesive upon the faces of pickers so that they may be employed to coat the labels with adhesive prior to the application of said labels upon a bottle. When the pickers have transported a label from the packs 53 and 54 to spaced positions adjacent to the bottle 50, a grip-finger 60 is moved from a remote position to a position over the label and thereafter caused to approach the label in a linear movement and tangentially engage it to uniformly remove it from the pickers without tearing and locate it upon the bottle 50 without slippage. As the pickers again swing upward preparatory to transferring another label to the next bottle, a pair of wipers 62 and 63 are arranged to resiliently engage the label and press it into firm contact with the bottle. Upon completion of the wiping operation, the wipers and grip-finger are removed automatically therefrom and the labeled bottle is then replaced by a new bottle in holder 51, preparatory to the next automatic labeling cycle.

Figure 6:
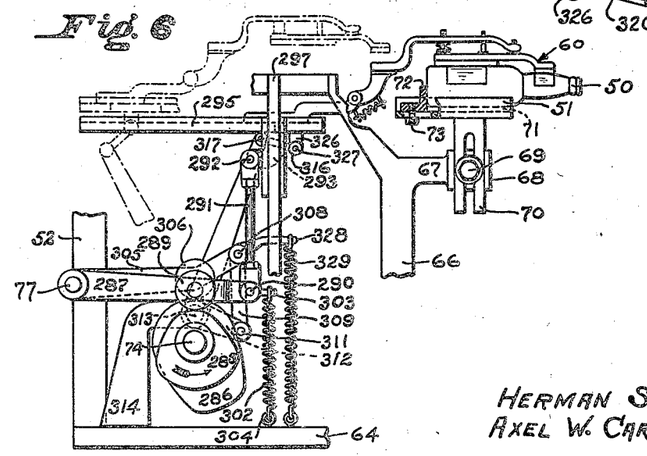
Fig. 6 is a fragmentary view, taken approximately along the lines 6—6 of Figs. 3 and 5, and illustrating the grip-finger operating mechanism.

As illustrated, our machine comprises a suitable frame 52 including a bottom table 64 and a top table 65. A support bracket 66 rigidly secured between the respective tables 64 and 65 is provided with a laterally protruding arm 67 terminating in head 68. A clamping bolt 69 threaded within head 68 frictionally engages a depending bifurcated portion 70 of bottle holder 51 and serves to horizontally support bottle 50 in desired adjustable position. As shown in the accompanying drawings, the bottle holder is preferably so shaped as to provide a depressed portion 71 adapted to receive the body portion of a bottle and rigidly support it in position. As illustrated in Fig. 6, a slot is provided in the rearward portion of depression 71 and a bracket 72 is slidably mounted therein and fastened in desired adjusted position by a cap-screw 73 or other similar device whereby the bottle may be longitudinally located in its holder. Hence, it will be appreciated that the bottle 50 may be located both vertically and horizontally in desired adjusted positions relative to the labeling mechanism hereafter described. To facilitate correctly timed and automatic operation of the various mechanisms of our invention, a camshaft 74 having a plurality of cams thereon is suitably journaled within bearings at the top of upstanding supports 75 and 76 secured to table 64. A back shaft 77 is clamped in suitable bearings to the rear frame of the machine as illustrated and arranged to support a plurality of cam levers for pivotal movement whereby various linkages connected therewith may be employed to operate the machine. By employing a construction of this type, the back shaft and the camshaft may be individually removed, thereby facilitating adjustments and repair of the machine.

*Picker mechanism*

Figure 1:
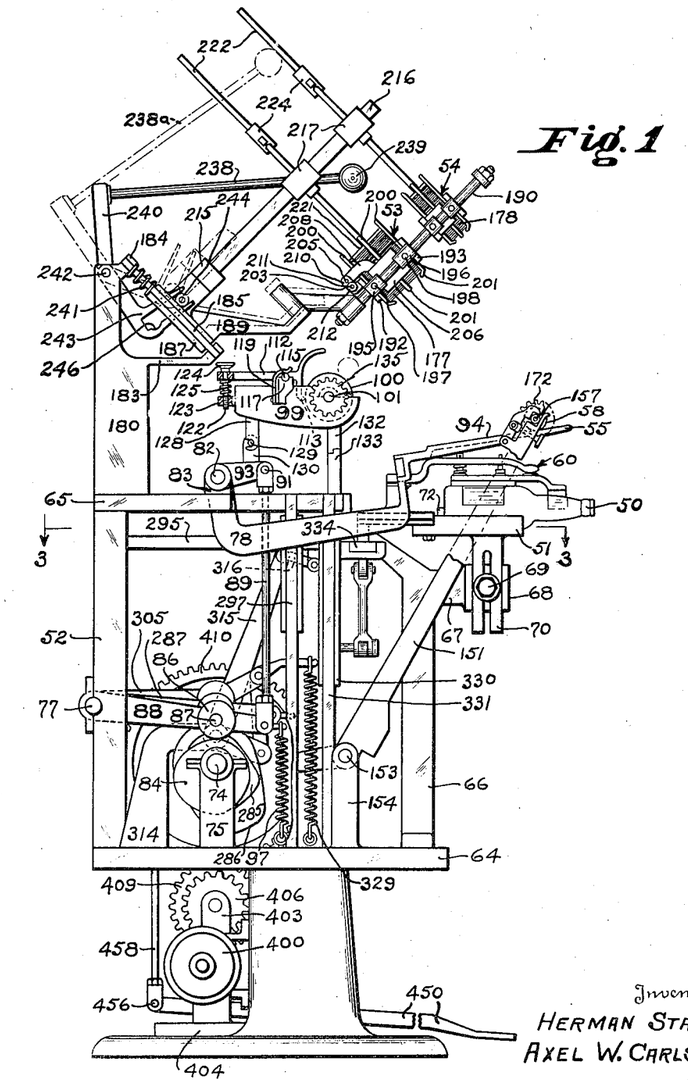
Fig. 1 is a side elevation of our invention, which is partly broken away for clarity of illustration.
Figure 2:
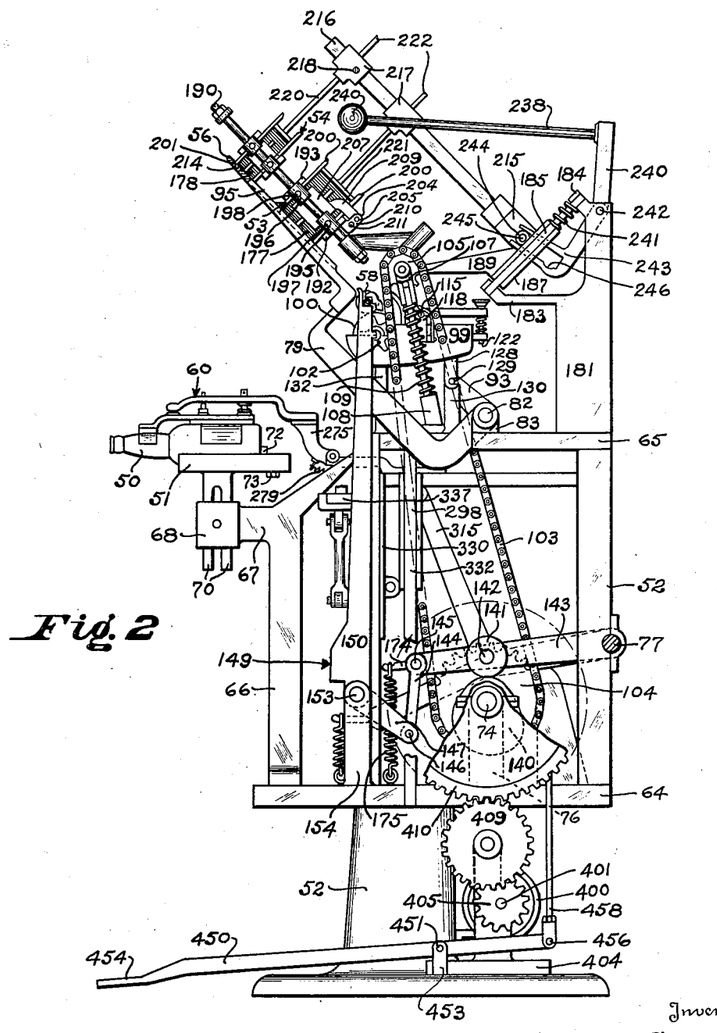
Fig. 2 is a fragmentary view showing the other side of the machine.
Figure 3:
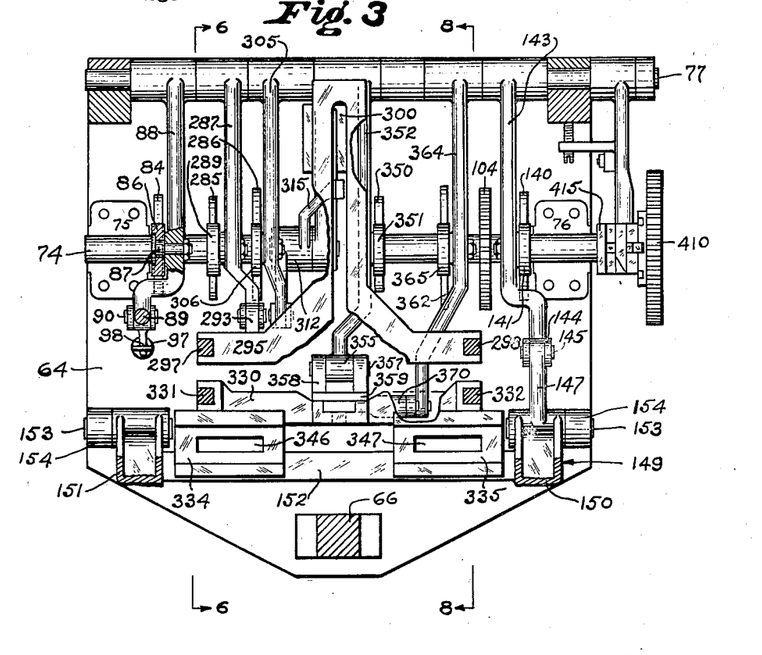
Fig. 3 is a fragmentary sectional view, taken approximately along the line 3—3 of Fig. 1.
Figures 5, 7:
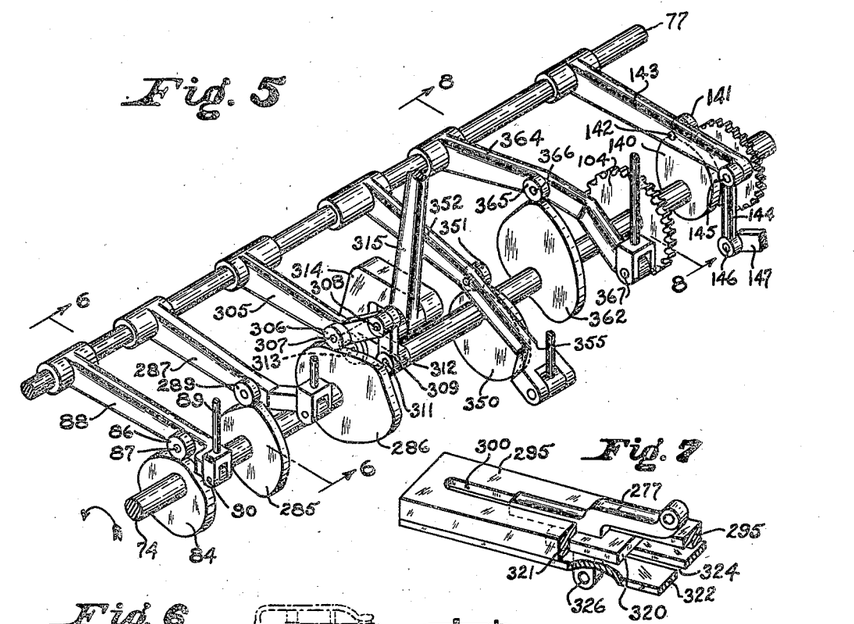
Fig. 5 is a perspective view showing the relative positions of the cams and rocker arms at the time when the label is stripped from the pickers.
Fig. 7 is a perspective view illustrating the horizontal slide movement of the grip-finger.
Figure 24:
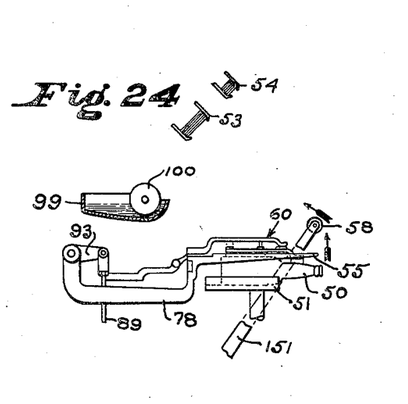

Referring particularly to Figs. 1 and 2, the picker mechanism may comprise two spaced pickers 55 and 56 supported by the respective arms 78 and 79 which are rigidly secured to a cross shaft 82 by means of keys or other suitable locking devices to cause simultaneous angular movement therewith. Cross shaft 82 is journaled in suitable brackets 83 secured to the top table 65. As illustrated in Figs. 1, 3 and 5, a picker cam 84 is rigidly keyed or otherwise suitably secured to camshaft 74 for rotational movement therewith. Rotational movement of shaft 74 and cam 84 is transmitted through a cam roller 86 rotatably journaled on a pin 87 to a picker cam lever 88 which in turn is journaled upon back shaft 77 for free pivotal movement thereon. An adjustable link 89 is pivotally secured by means of a pin 90 at its lower end to the forward end of picker cam lever 88 and pivotally secured at its upper end by means of a journal pin 91 to a lever 93 angularly secured to cross shaft 82 as by a key or other suitable well known device. It will thus be apparent that rotary movement of shaft 74 transmits a similar rotary movement to picker cam 84 which in turn transmits an angular movement to picker cam lever 88 about shaft 77, and through link 89 and lever 93 serves to simultaneously swing picker arms 78 and 79 and cause pickers 55 and 56 to cyclically move back and forth through an arcuate path from the position shown in Fig. 2 to the position shown diagrammatically in Fig. 24. Pickers 55 and 56 are further provided with spaced slots through their respective top faces 94 and 95 arranged to receive protruding portions of the label holders as will be later described. These top faces which lie substantially in the same plane, are automatically coated with a suitable adhesive such as gum and the pickers which are thereafter brought into contact with the bottom labels held within each pack of labels, remove a single label from each pack, transfer a coating of gum thereto and thereafter transfer the labels to positions adjacent to the article being labeled. Since a machine of this type is devised to be operated at a relatively fast rate of speed, a spring 97 is secured to a protruding hooked portion 98 at the forward end of picker cam lever 88 and to the bottom table 64 as shown in Fig. 1, whereby cam roller 86 will be assured of constant rolling contact against the operative face of picker cam 84 and the picker movement will be accurately and precisely controlled at all times by the rotation of cam 84.

*Gumming mechanism*

Various types of mechanisms may be employed to apply gum to the picker faces 94 and 95, but our preferred form of gumming mechanism comprises the construction shown in Figs. 1 and 2, wherein a gum box 99 arranged to hold a suitable supply of adhesive such as gum is provided with a gum roll 100 rotatably mounted upon a shaft 101 suitably journaled within the ends of the box. The gum roll 100 is so positioned for rotation within the gum box that the lower portion thereof will remain constantly immersed in the gum, even though there be only a small amount of gum in the box. As shown in Fig. 2, the right-hand end of shaft 101 is provided with a sprocket 102 which is engaged by a chain 103 positively driven by a sprocket 104 fixedly mounted on camshaft 74 for integral rotation therewith. The upper end of chain 103 is carried by a freely rotatable sprocket 105 journaled within a support 107 which is slidably mounted upon a reduced portion of a substantially vertical support 108, and a coil spring 109 surrounding the reduced portion serves to maintain a constant upward resilient pressure against support 107 to take up any loose play in chain 103. It will thus be appreciated that any rotational movement of shaft 74 will be transmitted through sprocket 104, chain 103 and sprocket 102 to rotate gum roll 100 in the gum box and maintain its peripheral face coated with a fresh supply of adhesive.

To further aid in maintaining a uniform and evenly distributed layer of adhesive on the peripheral face of roll 100, a scraper 112 is maintained under adjustable tension thereagainst. To accomplish this, scraper 112 is provided with a depending portion having a sharp protruding shoulder 113 which may be secured in tangential engagement with the entire peripheral face of roll 100 and serve to maintain the coating of gum thereon at a desired thickness. Scraper 112 is pivotally supported at each end upon shaft portions 115 integral therewith and journaled within bearings 117 and 118 and it is removably maintained in position by suitable means, such as springs 119. Adjustments of scraper 112 against roll 100 may be easily accomplished by means of a screw 122 journaled in the rearward portion of the scraper and threaded in a lug 123 protruding from the back of the gum box. The upper end of screw 122 is preferably provided with a manually operable head 124 to facilitate adjustment, and a coil spring 125 is positioned between lug 123 and scraper 112 to maintain the scraper in desired adjusted position and prevent the screw 122 from changing its adjustment due to vibration of the machine.

To facilitate cleaning of the various parts of the gum box, the entire gum box assembly may be easily removed as a unit from the machine. To accomplish this, the rear portion of the gum box is provided with a pair of spaced depending members 128 each of which has a hooped portion at its lower extremity arranged to removably hook over a pin 129 journaled within a supporting bracket 130 and projecting above the top table 65. The front portion of the gum box is provided with a pair of spaced depending members 132 each of which is provided with a stepped portion at its lower extremity mating with a similar stepped portion in an upright 133 secured to the top table 65. It will thus be appreciated that whenever the operator of the machine desires to remove the gum box for a cleaning operation, he may easily accomplish this by releasing the tension upon chain 103 by compressing spring 109 and removing the chain from sprocket 102, whereupon the gum box may be pivotally swung about pins 129 to open the stepped connections between parts 132 and 133, and thereafter the hooked portion of depending members 128 may be unfastened from pins 129 to bodily remove the gum box and its associated parts from position. Furthermore, by removing screw 122, scraper 112 may be quickly and easily slipped from position. As shown in Fig. 1, the left-hand end of shaft 101 also has a gear 135 secured thereon, whereby positive rotation may be transmitted to a gum transfer roll, as will be hereinafter described.

Figure 15:
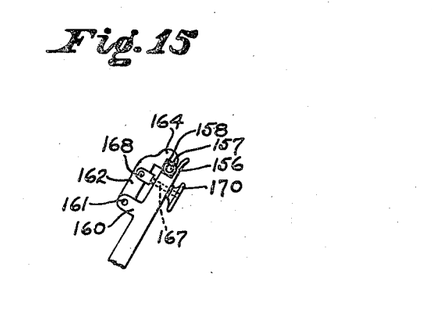
Fig. 15 is a fragmentary view showing the transfer roll support.

To cause the pickers 55 and 56 to coat the bottom label of each label pack within its holder and thereafter transfer said labels to a position adjacent to the article being labeled, the picker faces 94 and 95 must be evenly coated with a thin layer of adhesive prior to each picking operation and preferably during their movement towards the label magazines 53 and 54. This is accomplished by a gum transfer mechanism, as illustrated in Figs. 1, 2, 3 and 5. The right-hand end of camshaft 74, as viewed in Figs. 3 and 5, is provided with a rocker cam 140 secured thereto and arranged for integral rotation therewith. Rocker cam 140 transmits movement through a cam roller 141 and supporting stud 142 to a rocker cam lever 143 journaled at its rearward end for free pivotal movement upon back shaft 77. A substantially vertical depending link 144 is pivotally connected to the forward end of lever 143 by a pin 145 and the lower end of the link 144 is pivotally connected by means of a pin 146 to an arm 147 laterally projecting from a rocker frame 149. The rocker frame preferably comprises an integral yoke shaped member having two upwardly extending arms 150 and 151 interconnected at their lower ends by a rigid arm 152 and journaled upon two coaxial shafts 153 supported within a pair of spaced upstanding brackets 154 extending above the lower table 64. The tops of arms 150 and 151 are provided with stepped portions 156 arranged to axially support the transfer roll 58 which receives gum from the peripheral face of gum roll 100 and thereafter spreads a uniform coating of gum upon the picker faces 94 and 95. As shown in Figs. 1 and 15 the transfer roll 58 is secured to a supporting shaft 157 journaled at each end in the sleeve members 158 which in turn are removably clamped in the stepped portions 156 at the upper extremity of arms 150 and 151. The arms 150 and 151 are provided with protruding bifurcated lugs 160 having pins 161 therethrough upon which the clamp members 162 are pivotally secured. The upper extremity of each of the members 162 is provided with a stepped portion 164 arranged to be firmly secured against a sleeve 158 by means of a screw 167 which is pivotally secured at one end by a pin 168 to an intermediate portion of members 162 and slidably passes through a rocker arm. The screw is secured in position by means of a hand nut 170 threaded thereon. It will thus be appreciated that adjustments of hand nut 170 regulate the clamping force of the stepped portion 164 against sleeves 158 and provide for ready removal of the transfer roll and bearings as a unit.

To facilitate an even distribution of gum from gum roll 100 to transfer roll 58, the left-hand end of shaft 157 has a gear 172 secured thereon. When rocker cam 140 actuates cam lever 143 and its associated linkage to move rocker arms 150 and 151 to the position shown in Fig. 2, the transfer roll 58 will tangentially contact with the gum roll 100 and gears 172 and 135 will be enmeshed. Due to the difference in diameter of the transfer roll and the gum roll, both of these rolls will be positively rotated at different surface speeds, causing an even and very thin distribution of gum upon the transfer roll, which is transferred by said roll to surfaces 94 and 95 of the pickers 55 and 56. Cam lever 143 is provided with a protruding member 174 at its forward end which is engaged by a tensioned coiled spring 175 connected to the lower table 64 by an eye bolt or other suitable device. Since this spring 175 is always under resilient tension, cam roll 142 is constantly maintained in peripheral operative contact with rocker cam 140, whereby movement of the transfer roll is accurately controlled to operate in timed relation to other parts of the machine.

Cams 84 and 140 fastened to rotate with camshaft 74 are so shaped that the transfer roll will contact with gum roll 100 and be coated with gum therefrom, while the pickers 55 and 56 are removing and locating a label from each pack of labels within the holders 53 and 54 to a position adjacent to the surface to be labeled. After the labels have been removed from the pickers by the grip-finger and the pickers are on their upward stroke towards the label holder preparatory to picking the next label the transfer roll 58 contacts with surfaces 94 and 95, applying a fresh coating of gum thereon.

*Label carrier mechanism*

A pack of labels is suitably held in adjustable position relative to the oscillatable pickers 55 and 56 and the holder or magazine for said labels is preferably constructed so as to accommodate labels of different sizes. In our preferred construction, as illustrated in Figs. 1 and 2, we have shown two label holders or magazines 53 and 54 respectively arranged to adjustably hold a pack of body labels 177 and a pack of neck labels 178. A pair of spaced supports 180 and 181 are secured to the back of the machine and extend above the top table 65 to support the label holder mechanism. Supports 180 and 181 are each provided with a pair of outwardly extending arms 183 and 184 having guide rods 185 rigidly secured therebetween in spaced relation and arranged to slidably support a bracket 187. The bracket 187 is provided with an outwardly extending arm 189 arranged to support a pair of parallel guide rods 190, between which the label holders 53 and 54 are adjustably secured longitudinally thereof.

Referring particularly to the label holder 53 which is arranged to carry a pack of labels for the body portion of the bottle 50, two brackets 192 and 193 extend between the spaced rods 190 and are provided with heads 195 and 196 which are respectively journaled thereon and are secured in slidably adjusted position by means of screws 197 and 198 threaded in heads 195 and engaging rods 190. The body portions of brackets 192 and 193 have a plurality of guide bars 200 secured thereto which are provided with slightly extending hooked portions 201 at their lower ends which prevent the labels from falling out of the holder as shown in Figs. 1 and 2. Bracket 192 is further provided at each end with spaced upstanding arms 203 and 204 having a guide rod 205 extending therebetween.

A pair of brackets 206 and 207 supported by arms 208 and 209 are slidably mounted upon guide rod 205 at each end thereof in such a manner as to further aid in supporting the ends of label pack. To accomplish this, the brackets 206 and 207 also have guide bars 200 secured thereto which engage the ends of the labels within the pack. The arms 208 and 209 are provided with depending portions 210 which are threaded at their lower ends upon a threaded rod 211 journaled at its ends within the upstanding arms 203 and 204. Rod 211 is provided with a right-hand thread at one end and a left-hand thread at the other end threaded within the respective depending portions 210 whereby brackets 206 and 207 may be simultaneously moved towards and from the label pack by rotating rod 211. We further provide a knob 212 fastened to one end of rod 211 whereby brackets 206 and 207 may be simultaneously adjusted to bring guide bars 200 into desired position. It will thus be appreciated that by loosening screws 197 and 198, brackets 192 and 193 may be slidably adjusted relative to each other on rods 190 to bring guide bars 200 into contact with the sides of the label pack and by rotating knob 212, brackets 206 and 207 may also serve to bring other guides 200 into engagement with the ends of the label pack. In this manner, labels of any desired size may be maintained within the holder 53 and the label pack itself may be adjusted to any relative position on rods 190. These various adjustments are so made that the labels are slidably supported and the bars 200 simply serve to position the labels with a minimum of friction.

Since many bottles also have a neck label applied thereon, we have made the rods 190 of sufficient length so that a neck label holder or magazine 54 may be adjustably secured thereon in desired spaced relation to the label holder 53. It is not deemed necessary to go into a detailed description of this holder which secures the pack of neck labels 178 in position, since its construction is comparable to that of the body label holder 53. As heretofore explained, the pickers 55 and 56 are arranged to be swung upward until their top faces 94 and 95, which have been previously coated with gum, will engage the bottom label from each holder. To facilitate this label engagement, the pickers are each provided with holes 214 aligned with the guide rods 200. It will thus be apparent that as the pickers swing downward and away from the label packs, the bottom label from each of the packs 177 and 178 will be pulled from the hooked portions 201.

Figures 8, 9, 12:
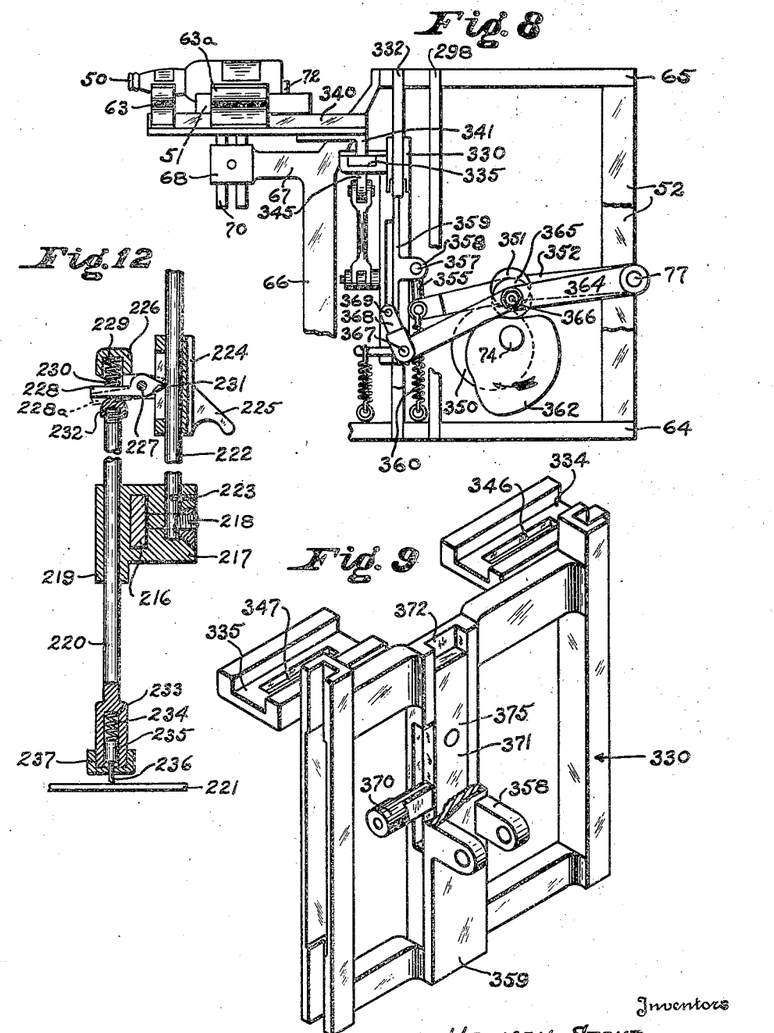
Fig. 8 is a fragmentary view taken approximately along the lines 8—8 of Figs. 3 and 5, showing the bottle wiper mechanism.
Fig. 9 is a perspective showing of the wiper slide and its associated parts.
Fig. 12 is a sectional view, showing the label follower mechanism.

The bracket 189 which supports the label holder mechanism is also provided with an outwardly extending arm 215 having a rectangular rod 216 extending therefrom and arranged to carry a label follower mechanism for each label holder and provide a predetermined but resilient pressure against the top of each label pack to aid the feeding of the labels within the holders as the picker removes successive labels. As shown in Fig. 12, each label follower mechanism may comprise a bracket 217 arranged for slidable movement on rod 216 and secured in adjusted position by means of set-screw 218. Bracket 217 is provided with a depending portion 219 having a follower rod 220 slidably journaled therein and arranged to impress a predetermined pressure against a press plate 221 against the top of each label pack. Each bracket 217 is further provided with an upwardly extending rod 222 rigidly secured thereto by means of a locking pin 223 or other suitable device.

Figure 17:
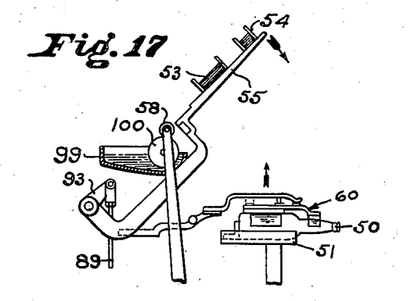

A follower member 224 is slidably mounted on each rod 222 and provided with a convenient handle 225, whereby it may be easily lifted and slid upon rod 222 to free the pressure upon the follower rod 220. Member 224 is provided with an outwardly extending arm 226 having a laterally extending pin 227 secured therein and arranged to pivotally support a lock arm 228. Arm 226 is provided with a recessed portion 229 arranged to receive a spring 230 which imparts a resilient downward pressure against the outer end of lock arm 228 and tends to cause a pivotal movement thereof about pin 227 and force a protruding jaw 231 at the other end of said arm against rod 222 thereby preventing any upward sliding movement of member 224. Rod 220 has a cap 232 secured to its upper end, which provides a smooth contact against arm 228 and also prevents rod 220 from falling through member 219 during the insertion of a new pack of labels in a label holder. The lower end of rod 220 is provided with a recessed portion 233 adapted to receive a spring 234 which is compressed against a follower pin 235 in engagement with plate 221. Follower pin 235 is provided with a reduced portion 236 which passes through a cap member 237 screw threaded or otherwise suitably secured at the lower end of rod 220. It will thus be appreciated that the weight of follower member 224 combined with the cushioning properties of spring 233 serves to provide a continuous and uniform pressure against the label pack. When the pickers 55 and 56 move up to engage a label from the pack, as shown in Figs. 2 and 17, the pressure of cap 232 against arm 228 will rock said arm about pin 227 and firmly engage jaw 231 with rod 222, thereby preventing any upward movement of member 224 and spring 234 will serve to resiliently urge the bottom label of the pack into firm engagement with the pickers so that an even coating of gum will be spread on said label. After the pickers have removed a label from the pack, the pressure on spring 234 is automatically released and spring 230 pivotally moves lock arm 228 to position 228a thereby releasing jaw 224 and rod 220 to slidably move downward and maintain a uniform follower pressure on the label pack. However, whenever the operator desires to insert a new pack of labels within the holder, a very light pressure upon handle 226 of link 225 will serve to release jaw 234 and permit the label follower mechanism to be easily removed from operative position.

In making various adjustments of the machine, it is convenient to bodily shift the entire label carrier mechanism to an inoperative position where the upward movement of the pickers will be insufficient to pick the bottom label from a label holder. To accomplish this, we provide an easily accessible lever 238 having a convenient handle 239 at one end and secured to the upper end of a bell crank lever 240 at its other end. As illustrated in Fig. 1, lever 238 may be manually shifted to the position 238a and the label carrier mechanism will be lifted as a unit to the position indicated by dot and dash lines.

The bracket 187 which is slidably mounted upon the spaced rod 185, is normally urged into operative position as shown in full lines in Figs. 1 and 2 by means of the springs 241 surrounding the upper ends of rods 185 and compressed between arm 184 and bracket 187. The bell crank lever 240 which is pivotally supported intermediate of its ends upon a pin 242 has a bifurcated portion 243 laterally projecting from its lower end and slidably engaging a roller 244 rotatably mounted upon a stud 245 secured within the outwardly extending arm 215 of bracket 187. Hence, any upward movement of lever 238 will result in an angular movement of bell crank lever 240 and an upward sliding movement of bracket 187 upon its supporting rods to lift the label packs from operative picking position. The rear portion of the bifurcation 243 is provided with a depressed seat 246 arranged to receive roller 244 and lock the various parts in their dot and dash indicated positions when lever 238 has been shifted to position 238a (Fig. 1). It will be understood, of course, that the label carrier mechanism may again be shifted to operative position by a downward pull on lever 238.

*Grip-finger mechanism*

Figure 11:
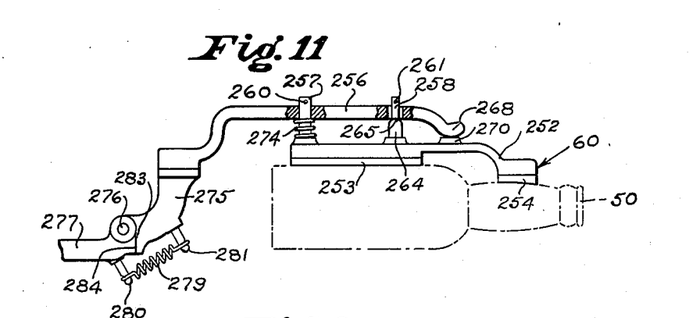
Fig. 11 is a view, partly broken away, showing the grip-finger and its associated parts.

To facilitate locating the labels in the desired position upon the bottle or other article being labeled, we have provided the grip or presser finger 60 which is automatically advanced from a remote position, as shown in dot and dash lines in Fig. 6, to a position over the work (Fig. 23) and then downward in a linear movement to uniformly engage the label held upon the faces 94 and 95 of the pickers to remove it therefrom and apply it in desired position upon the bottle, after which a suitable wiper mechanism serves to press the remainder of the label into position. As shown in Fig. 11, the grip-finger may comprise a suitably shaped presser foot 252 having resilient contact members, such as rubber pads 253 and 254, secured thereto in any suitable manner and arranged to firmly hold the label in position during its application upon the bottle. The presser foot 252 is arranged to depend from a support arm 256 by means of the studs 257 and 258 which are secured to the foot and slidably mounted in the support arm and held in position by means of pins 260 and 261. Stud 258 is further provided with an enlarged lower portion 264 having a rounded shoulder 265 about which the presser foot may pivot. The support arm 256 is further provided with a curved depending end portion 268 engageable with a boss 270 on the presser foot. A coil spring 274 surrounding stud 260 is compressed between presser foot 252 and support arm 256 to pivot presser foot 252 about surface 265 and maintain depending portion 268 and boss 270 in contact. It will be appreciated that the provision of a construction of this type facilitates even contact of the cushioned pads 253 and 254 of the presser foot in uniform contact with the bottle and prevents any tendency of the labels to slip thereon while they are being applied in position. If desired, the presser foot may be composed of a malleable casting which may be bent to relatively position the contact pads 253 and 254 so that they will uniformly engage the bottle 50.

Supporting arm 256 is suitably and rigidly secured to a member 275, which in turn is pivotally supported by means of a pin 276 to a slide member 277. A coil spring 279 extending between studs 280 and 281, respectively located within members 277 and 275, further serves in compensating for any difference in size or shape of bottles which are presumably of the same type. Spring 279 normally tends to maintain members 275 and 277 in a fixed position relative to each other by maintaining their abutting faces 238 and 284 in contact. As shown in Figs. 1, 3, 5, 6 and 7 the grip-finger mechanism is actuated by a grip-finger cam 285 and a grip-finger slide cam 286, which are of suitable shape and are fixedly secured in desired position upon camshaft 74 in required angular relation. The grip-finger cam actuates a grip-finger lever 287 pivotally secured on the back shaft 77 and having a cam roller 289 journaled upon a pin supported on the lever. The forward end of the grip-finger lever is pivotally secured by means of a pin 290 to an adjustable vertical link 291 which is secured by means of a pin 292 at its upper end to a depending arm 293 of a grip-finger table 295 mounted for vertical slidable movement upon a pair of spaced rectangular guide bars 297 and 298 secured at their respective ends to the top and bottom tables 64 and 65. Table 295 is provided with a horizontally extending slotted portion 300 within which the support member 277 is mounted for slidable movement. It will thus be noted that any rotary movement of cam shaft 74 and grip-finger cam 285 transmits a rocking movement to cam lever 287 and a resultant vertical movement to the grip-finger 60 through connecting link 291, table 295 and members 277, 275 and 256. The grip-finger cam is so shaped that as it rotates in timed relation to other parts of the machine the grip-finger will move into uniform contact with a label and strip it from the pickers and thereafter temporarily secure it in position on the bottle until the label is permanently fastened in position. A coil spring 302 is resiliently secured under tension between a protruding portion 303 at the forward end of grip-finger lever 287 and a suitable device such as an eye bolt 304 fastened to the bottom table to maintain cam roller 289 in continuous operative engagement with cam 285 and assure continuous cam controlled operation of the vertical grip-finger movement.

In addition to the vertical movement of the grip-finger towards and from the bottle, we have also provided a cam actuated mechanism operating in timed relation therewith which serves to horizontally move the grip-finger from a remote position to a position directly above the bottle so that the grip-finger may be withdrawn from the path of the pickers 55 and 56 while they are transporting a fresh label into labeling position. To accomplish this, the grip-finger slide cam 286, which is mounted on camshaft 74 for integral movement therewith, serves to actuate a cam lever 305 through a cam roller 306 journaled on a pin 307 projecting therefrom and cause said cam lever to rock upon its pivotal support or back shaft 77. Cam lever 305 is pivotally connected by means of a pin 308 to a link 309 which in turn is pivotally connected by means of a pin 311 to a bell crank lever 312 journaled upon a shaft 313 laterally protruding from a support 314 secured to the bottom table 64. Bell crank 312 is provided with an upwardly extending arm 315 which is pivotally connected to a link 316 by means of a pin 317 and arranged to slidably actuate member 277 within the slotted portion 300 of table 295.

As shown in Fig. 7, the slide member 277 is provided with an enlarged plate 320 slidably mounted within guideways 321 of table 295 and supported by a lower cover plate 322 fastened to the bottom of table 295. The cover plate 322 is provided with a slotted portion 324 through which a depending member 326 secured to plate 320 is pivotally fastened to the link 316 by means of a pin 327. It will thus be appreciated that rotational movement of the grip-finger slide cam 286 serves to rock cam lever 305 and actuate link 309, bell crank 312, link 317 and cause a horizontal slidable movement of the grip-finger mechanism from the retracted position shown in Fig. 6 in dot and dash lines to the full line position shown therein. This horizontal slidable movement of the grip-finger mechanism from the remote position to a position above the bottle preferably occurs in such timed relation to other mechanism of the machine that the grip-finger is always moved into contact with the label with a linear vertical movement which serves to evenly remove it from the pickers without tearing and place it upon the bottle without slippage. Lever 305 is further provided with a forwardly protruding arm 328 which is resiliently urged by means of a spring 329 toward the base of the machine to always maintain lever 305 and the associated mechanism under the positive control of cam 286. It will be understood, of course, that cam 286 is so shaped and so angularly fixed upon shaft 74 that it will cause the desired horizontal grip-finger movement in required timed relation to the other operations of the machine.

Wiper mechanism

As illustrated in Figs. 4, 5, 8 and 9 we have further provided our machine with a wiper mechanism which serves to engage the label after it has been located upon the bottle by the grip-finger and wipe it into firm adhesion with the bottle with an ever-increasing pressure. This is accomplished in timed relation to other operations of the machine by means of cams secured to the main camshaft 74. We have provided a vertically movable wiper slide 330 arranged for vertical slidable movement upon two spaced bars 331 and 332 extending between the bottom table 64 and top table 65. Slide member 330 is further provided with spaced, horizontal ways 334 and 335 within which slide members 336 and 337 are automatically moved in timed relation to other functions of the machine to cause the wipers to horizontally approach or recede from each other.

Figure 4:
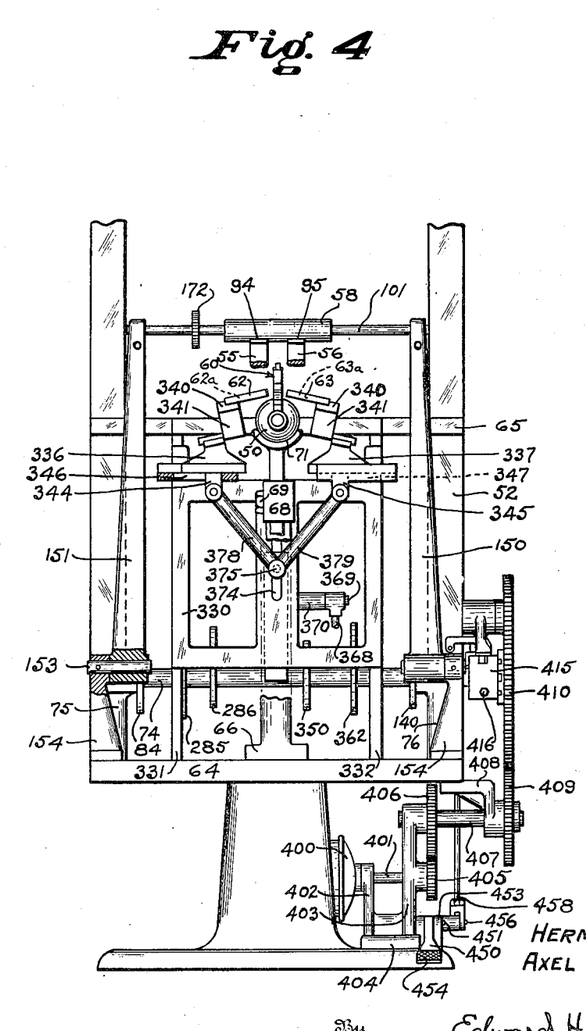
Fig. 4 is a fragmentary front elevation of the invention.

The wiper members are preferably composed of a resilient material of the general nature of rubber, and in the present instance, we employ four of these wipers, two of which, 62 and 63, are arranged to simultaneously engage a label on the body portion of the bottle and two of which, 62a and 63a, engage a label on the neck portion of the bottle. These wipers are suitably secured to supports 340 provided with depending portions 341 secured respectively to slide members 336 and 337. Slide members 336 and 337 are provided with the respective depending portions 344 and 345 which extend through slotted portions 346 and 347 in the ways 334 and 335. Thus, it will be appreciated that any vertical movement of the wiper frame 330 will serve to cause a similar vertical movement of the wipers, and cause a wiping operation across the labels, provided that the slide members 336 and 337 are at the inner ends of slots 346 and 347 as shown in Fig. 4.

To provide a vertical movement of the wipers, we employ a wiper slide cam 350 suitably shaped and affixed to camshaft 74 to operate the wiping mechanism in timed relation to other parts of the machine. The wiper frame cam is peripherally engaged by a roller 351 journaled on a pin projecting from a cam lever 352 and rotation of said cam serves to rock the cam lever about its rearward end journaled on the back shaft 77. The forward end of cam lever 352 is pivotally connected by a link 355 to a stud 357 secured within a bifurcated, protruding portion 358 of a plate 359 secured to wiper frame 330. A suitable coil spring 360 connected under tension between the forward end of cam lever 352 and bottom table 64 serves to maintain the lever mechanism always under control of cam 350.

Slide members 336 and 337 are arranged for simultaneous movement towards and from each other, as controlled by a wiper cam 362 of suitable shape and secured to camshaft 74. As illustrated in Figs. 3, 8 and 9 rotation of cam 362 transmits a rocking movement to a wiper cam lever 364 by means of a cam roller 365 journaled on a pin 366 suitably fastened to the cam lever 364. Cam lever 364 is pivoted at its rearward end to back shaft 77 and is provided at its forward end pivotally connected by a pin 367 to a link 368 which at its other end pivotally engages a pin 369 secured within an outwardly extending arm 370 of a member 371 vertically slidable within ways 372. The forward central web of frame 330, as shown in Fig. 4, is provided with a slotted portion 374 through which a pin 375 protrudes. Pin 375 is fixedly secured to slide member 371 at its rearward end, and at its forward end pivotally supports two arms 378 and 379 which are respectively pivotally secured to the depending portions 344 and 345 of members 336 and 337 by means of pins 380 and 381. It will thus be appreciated that rotary movement of wiper cam 362 serves to cause a rocking movement of cam lever 364 and through link 368 transmit a vertical sliding movement of slide 371 which in turn operates arms 378 and 379, causing the wipers to approach or recede from each other, as is required.

*Driving mechanism*

In order to drive the various mechanisms above described, we provide a suitable source of power, which in the present instance may comprise an electric motor 400 fastened to the base of the machine and having an armature shaft 401 protruding therefrom. Shaft 401 is journaled in the upwardly projecting arms 402 and 403 of a support 404 secured to the machine base, and provided with a driving pinion 405 fastened on one end thereof. The pinion 405 is enmeshed with an intermediate gear 406 secured to one end of a cross shaft 407 journaled in arm 403 and in a downwardly depending bracket 408 secured to table 64. Shaft 407 also has a gear 409 secured thereon which is enmeshed with a camshaft drive gear 410 freely rotatable upon the end of camshaft 74 and connectable therewith by means of a clutch mechanism.

*Clutch mechanism*

Figure 10:
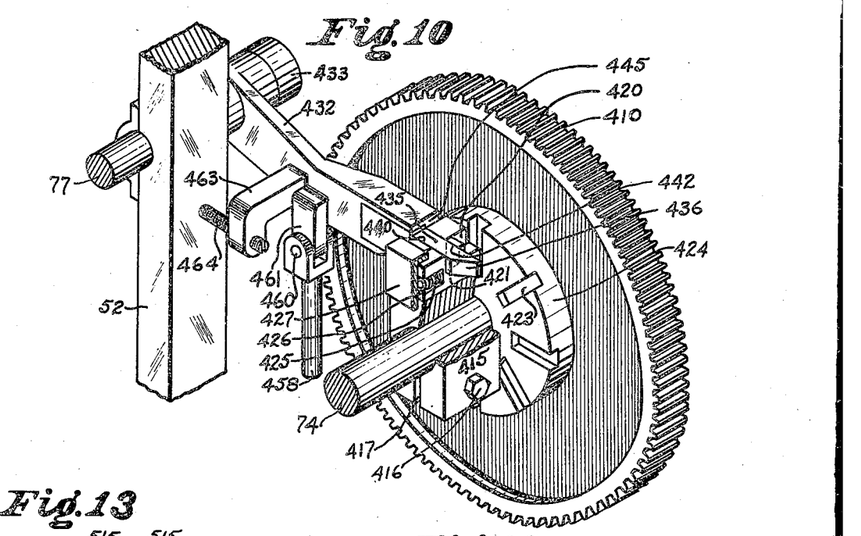
Fig. 10 is a perspective view of the clutch mechanism.

As illustrated, the right-hand end of camshaft 74 is provided with a clutch head 415 suitably secured thereon in desired angular relation to the cams by means of a cap-screw 416 which tends to close a slotted portion 417 and rigidly clamp the member 415 to the shaft in desired position. The clutch head 415 is also provided with a slotted portion 420 within which a clutch dog 421 is slidably mounted for movement into and out of engagement with any one of several radial slots 423 in a clutch plate 424 integrally secured to gear 410. The clutch dog is normally urged into engagement with said slots by means of a spring 425 mounted within a recess 426 and engageable with a plate 427 secured to head 415. The right-hand end of back shaft 77 is provided with a clutch release lever 432 pivotally secured thereon and axially held in position by means of a collar 433. The forward end of the clutch release lever is provided with a dog tooth 435 secured thereto and terminating in a forwardly projecting pointed nose 436 arranged to be inserted within a slot 440 of member 415 and engageable with a similarly disposed slot 442 within and transversely of dog tooth 435. It will be appreciated that whenever said dog tooth is engaged within slots 440 and 442, the clutch driving dog 421 will be released from engagement with slots 423 and there will be no driving connection between the source of power and camshaft 74 as shown in Fig. 10.

Figure 25:
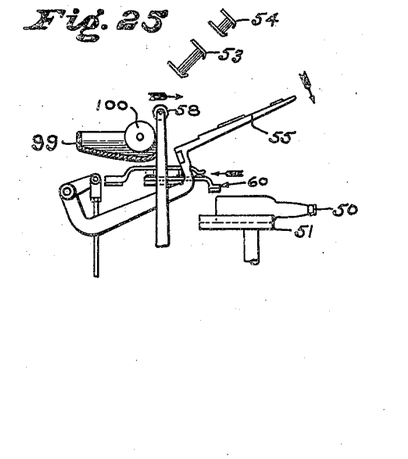

Our clutch mechanism has also been so devised that the machine will be stopped each time with the various parts in a so called neutral position as diagrammatically illustrated in Fig. 25. To accomplish this, the forward end of lever 432 is provided with a flat face or shoulder 445 adjacent to the position where the dog tooth 435 is received by the lever. This shoulder 445 is arranged to abut against the clutch head as shown in Fig. 10 and stop its rotation at a predetermined location. In view of the fact that the clutch head 415 is rigidly clamped to camshaft 74 in any desired angular relation, it will be apparent that the position at which the machine stops may be easily regulated so that the parts will be in various desired and accessible positions. As shown, we prefer to stop the machine with the pickers midway of their downward stroke, the gripfinger nearly completely withdrawn to its remote position and the rocker arms in a substantially vertical position.

Although the clutch release lever may be conveniently operated in various ways to move the dog 435 into or out of operative position, we preferably employ a foot actuated mechanism so that the machine operator may be free to use both of his hands in loading and unloading the machine. In our preferred construction, as illustrated, a foot pedal 450 is pivotally supported upon a pin 451 mounted within a bracket 453 fastened to the base of the machine. The forward end of the pedal is provided with a suitable conveniently located tread 454 and the rearward end of said lever is pivotally connected by a pin 456, to a substantially vertical adjustable link 458 pivotally connected at its upper end by a pin 460 to a depending portion 461 of lever 432. Lever 432 is further provided with an outwardly projecting arm 463 having an adjustable screw 464 threaded therein which engages an upright of the machine frame and limits the lower position of lever 432 as shown in Fig. 10. In the present construction, the weight of lever 432 and the associated parts is sufficient to cause the parts to normally lie in the position illustrated in Fig. 10 with the clutch disengaged and the tread end of pedal 450 in a raised position. It will thus be appreciated that during the normal operation of the machine, the operator keeps the foot pedal 450 depressed and the link 458 maintains lever 432 in a raised position so that dog 435 is out of engagement with slots 440 and 442, and spring 425 maintains clutch dog 421 in engagement with one of the slots 423, whereby power is transmitted to rotate camshaft 74 until the operator removes his foot from pedal 450. If desired, any suitable type of latch may also be provided to lock pedal 450 in a depressed position so that the machine operator will not be obliged to hold his foot on the pedal for long periods of time during the operation of the machine. Whenever the operator permits the pedal 450 to lift, lever 432 drops to the position shown and the wedging action of dog nose 436 as it is engaged by slots 440 and 442 withdraws the clutch dog from operative engagement thereby disconnecting power to camshaft 74. Due to the momentum of the machine, the parts continue to operate through a short distance after the clutch is disengaged and at this time the clutch head 415 abuts against shoulder 445 which stops the machine in a predetermined neutral position. When the operator again depresses pedal 450, dog 436 releases the action of spring 425 and clutch dog 421 again drops into operative engagement with one of the slots 423.

Operation

In the operation of our machine, the operator depresses foot pedal 450 thereby engaging the clutch and causing a rotation of camshaft 74 and cams thereon to continuously operate the machine through successive cycles until the clutch is again disengaged. To avoid duplication of description and to further clarify the operation of our invention, the complete cycle of applying a single label from each of the holders will be described in the order of operation of the various parts, and the relative positions of the parts when the machine is in an inoperative or neutral position will be later described. Hence, the various parts of the mechanism move through their cycle from the neutral position of Fig. 25 until they reach the respective positions shown in Fig. 16 and referred to as the start of a labeling cycle.

Figure 16:
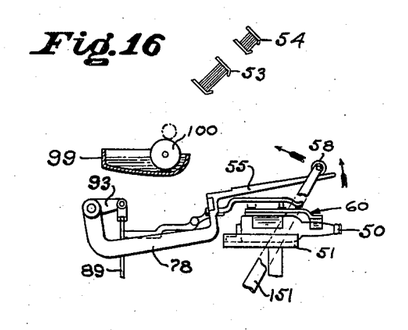
Figs. 16 to 25 inclusive are diagrammatic views illustrating the operative cycle of our invention.

As shown in Fig. 16, and indicated by arrows, the pickers 55 and 56 are on their upward movement a short distance above the bottle 50 when they are engaged by the transfer roll 58 which has been previously coated with gum from engagement with the gum roll 100. As the pickers swing upward, the rocker arms swing the transfer roll in an arcuate path towards the gum roll as indicated, and the transfer roll proceeds down surfaces 94 and 95 to evenly coat the pickers with gum, preparatory to a picking operation of a label from each of the label holders 53 and 54. The transfer roll 58 leaves the picker faces 94 and 95 and swings into frictional engagement with the gum roll 100 just prior to the engagement of said picker faces with the bottom label of each of the packs 177 and 178 (Fig. 17). The parts dwell for a short length of time in this position while the positively rotated gum roll transfers an even coating of gum to the transfer roll to be spread on the pickers during their next upward swing.

Figure 18:
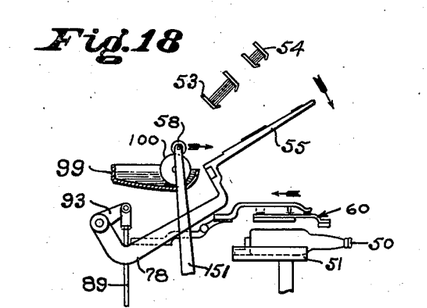

The resilient action of the label pack follower mechanisms serves to firmly impress the ends of the bottom label from each pack against the pickers so that as they swing downwardly therefrom (Fig. 18) the bottom label from each pack is withdrawn from its respective holder and carried by the pickers to a position adjacent to the bottle. During this label movement, the transfer roll swings forwardly from the gum roll as shown in Figs. 18 and 22 to the final forward position shown in Fig. 23 which is reached as the pickers attain their lowest or stripping position shown in Figs. 23 and 24.

Figure 22:
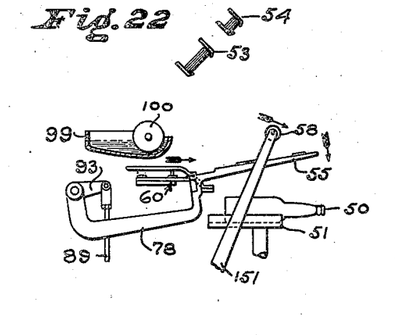
Figure 23:
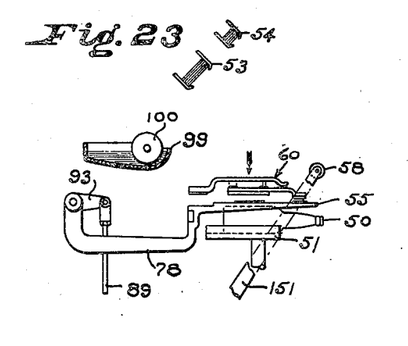

When the pickers have reached approximately the midpoint of their downward swing, the grip-finger 60 starts to move forward with a horizontal movement from a remote position above the plane of the picker faces 94 and 95 when in stripping position and under the gum box as shown in Fig. 22. The pickers dwell in their substantially horizontal stripping position of Figs. 23 and 24 while the grip-finger continues its horizontal movement to a position directly above the labels as shown in Fig. 23 at which point the horizontal grip-finger movement terminates and the grip-finger then moves downward with a substantially vertical linear movement into tangential contact with a central zone of each label between the pickers. This downward movement of the grip-finger is precisely in a plane at right angles to that of the labels and thus serves to firmly locate a central strip of each label upon the bottle without any tendency towards tearing or misplacement as is frequently the case with other label locating devices.

The grip-finger dwells in this clamped position while the pickers again start their upward movement (Fig. 16) thereby stripping the labels evenly from the pickers and maintaining them in initially located positions on the body and neck of the bottle. As the pickers continue their upward swing (Fig. 16), they are again engaged and coated by the transfer roll as heretofore described.

Figure 19:
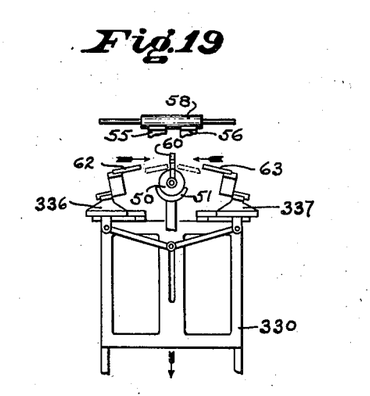

During the upward movement of the pickers as shown in Fig. 16, the wipers 62, 63, 62a and 63a are at the top of their vertical upward movement and starting to horizontally move towards each other from an open position wherein they lie at their greatest distance apart as shown in full lines of Fig. 19 to a closed position directly over the bottle as indicated in dot and dash lines of the same figure. The wipers reach their top closed position (Fig. 19) when the pickers are about midway of their upward movement after which the wipers remain in their closed position and move simultaneously with a downward stroke thereby engaging the ends of each label and wiping them into firm adhesion with the bottle with an ever increasing pressure due to the increased deflection of the wipers as they move over the bottle as shown in Fig. 20.

Figure 20:
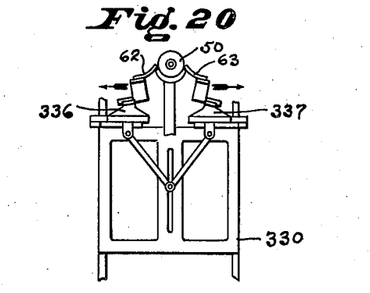
Figure 21:
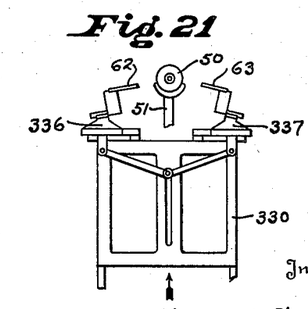

The wiping operation is completed and the wipers move from the position shown in Fig. 20 to the bottom open position shown in Fig. 21 during the dwell of the pickers in contact with the label packs as shown in Fig. 17. As soon as the wipers have completed the wiping operation the grip-finger 60 moves vertically upward and then horizontally back to a remote position beneath the gum box so that it will not interfere with the following downward picker movement as the next label is transported into position. The grip-finger reaches its top position above the bottle during the dwell of the pickers in picking position thereby giving the machine operator ample opportunity to remove the labeled bottle from the bottle holder 51 and insert an unlabeled bottle therein.

For convenience of accessibility of the various parts, we have adjusted our clutch mechanism to automatically stop the machine when a pair of labels are about midway of their downward travel, with the grip-finger nearly retracted and the transfer roll just leaving the gum roll in its forward stroke. With various parts so located, all area about the bottle is free and an operator may easily make any desired adjustments upon the machine. However, by angularly locating the clutch head 415 relative to shaft 74 the machine may be automatically stopped in any desired position.

Figure 13:
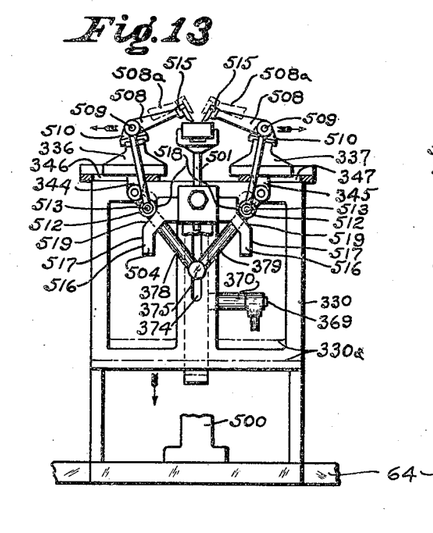
Figs. 13 and 14 show a modified form of wiper mechanism adapted to secure labels to flat surfaces.
Figure 14:
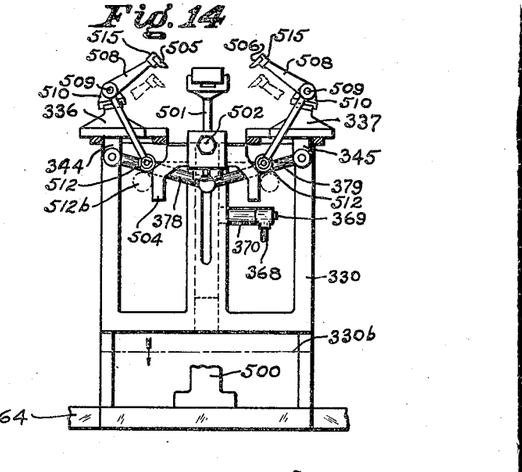

As shown in Figs. 13 and 14 we have provided a modification of our invention adapted for labeling articles of substantially rectangular cross section such as packages and the like. In this modified construction we employ the previously described machine which embodies the following article support and wiper mechanism arranged to wipe a label into firm adhesive engagement with a flat surface. To accomplish this, the supporting bracket 500, corresponding to bracket 66 of our preferred construction, is arranged to adjustably clamp an article support 501 in desired vertical position by means of a screw 502 whereby a package or other article having a flat surface to be labeled, may be rigidly supported in desired position. The forward upper end of bracket 500 has a cam rigidly secured thereto and arranged to simultaneously control the movements of a pair of wipers 505 and 506 across the flat face of the article to be labeled.

Since each of the wipers 505 and 506 are substantially duplicate in form except for the fact that one is of right-hand construction and the other left, similar parts will be indicated by like numerals. As illustrated, each wipers arm comprises a bell crank lever 508 pivotally supported at its midportion upon a pin 509 secured within a bracket 510 which in turn is supported in one of the slide members 336 and 337 which are simultaneously moved towards and from each other within the wiper slide 330 by means of the arms 378 and 379 actuated by slide 374. The bottom of each bell crank arm 508 has a roller 512 journaled thereon by means of a pin 513 and the top of each bell crank arm terminates in a head 515 adapted to receive one of the wipers 505 and 506 which are composed of rubber or other suitable flexible resilient material.

The cam 504 is provided with two oppositely disposed arms 516 having vertical faces 517 and 518 and an intermediate sloping face 519. It will thus be appreciated that the bell crank arms 508 will be maintained in a top open position by the cam faces 519 during the initial location and stripping of the label from the pickers, it being understood, of course, that the picking or gripfinger mechanism is the same as employed in our preferred construction heretofore described. As the slide frame 330 is moved to the position indicated in dot and dash lines 330a, the arms 508 will assume the respective positions 508a above and substantially centrally of the surface being labeled with the rollers 512 contacting cam faces 518. The downward movement of slide frame 330 to the full line position of Fig. 13 and thence to the position shown in Fig. 14 serves to move cam rollers 512 down the sloping cam faces 519 which are at such an angle as to cause the wipers 505 and 506 to simultaneously withdraw from each other in contact with the face of the article and firmly press the label into position. Further downward movement of slide frame 330 to position 330b serves to move cam rollers 512 to position 512b in engagement with cam faces 517 so that the wipers will be withdrawn from engagement with other parts of the machine.

It will thus be appreciated that we have provided a labeling machine which will continuously operate through a repetitive cycle at an extremely high rate of speed. In view of the fact that the machine is controlled by a foot actuated clutch the operator has both hands free to insert articles in labeling position and remove them when labeled.

In view of the fact that many changes could be made in the above construction and many apparently widely different embodiments of this invention could be made without departing from the scope thereof, it is intended that all matter contained in the above description or shown in the accompanying drawings shall be interpreted simply as illustrative and not in a limiting sense.

It is to be further understood that the language used in the following claims is intended to cover all of the generic and specific features of the invention herein described.

Having thus described our invention, what we claim as new and desire to secure by Letters Patent is:

1. In a wiper mechanism for bottle labeling machines, a vertically reciprocable slide member, wiper supports laterally movable in transversely disposed guides on said member, a wiper on each support resiliently engageable with the bottle, means to laterally move said wipers in said guides and towards each other to a position above the bottle and means operable in timed relation therewith to vertically move the slide member with the wiper supports fixed relative thereto, causing the wipers to resiliently engage the label and wipe it into firm contact with the bottle with gradually increasing pressure.

2. In a wiper mechanism for a bottle labeling machine, a vertically reciprocable slide member, guides therefor, a pair of wiper supports arranged for parallel lateral movement on the member towards and from each other, a resilient wiper on each support, cam actuated mechanism to simultaneously move the wipers towards each other to corresponding locations above the bottle, and cam actuated mechanism operable in timed relation therewith to move the slide member downward on its guides and cause the wipers to each assume a parallel linear movement and simultaneously wipe across the bottle.

3. In a wiper mechanism for a bottle labeling machine, a vertically reciprocable carriage, guides therefor, a pair of aligned ways disposed laterally of said carriage and located at each side thereof, a wiper member slidably supported in each of said ways for movement laterally of the carriage, cam operated mechanism to vertically reciprocate the carriage and separate cam actuated means operable in timed relation with said mechanism to laterally move the wipers towards each other to predetermined positions when the carriage is at its top position of reciprocation, maintain said wipers in fixed positions during the downward carriage movement, move said wipers to relatively remote positions at the bottom of the carriage reciprocation and maintain the wipers in said positions until the carriage is again reciprocated to its upper position.

4. In a wiper mechanism for a labeling machine adapted to apply labels to flat surfaces of articles, a vertically reciprocable member, guides therefor, an article support adjustably arranged to position an article to be labeled substantially centrally of the guides and above the path of movement of the vertically reciprocable member, a pair of wiper supports slidably positioned for lateral reciprocable movement on the vertically reciprocable member and towards and from each other, a pair of oppositely disposed wiper arms each being pivotally located upon a wiper support, a resilient wiper on the upper end of each wiper arm, and a cam engageable with the lower end of each wiper arm whereby a downward movement of the vertically reciprocable member will cause the wipers to resiliently engage the central portion of the surface being labeled and thereafter to simultaneously move away from said portion in the plane of said surface.

5. In a bottle labeling machine the combination with a bottle support, of a picker mechanism arranged to transport a label to a stripping position above a bottle on said support, a horizontally and vertically reciprocable grip-finger, means operable in timed relation to the picker mechanism to horizontally move the grip-finger to a position above the bottle and thereafter move said finger vertically downward to remove the label from stripping position and locate it on the bottle, a vertically reciprocable slide, a pair of wipers horizontally movable towards and from each other on said slide, cam actuated means operable in timed relation to the picker mechanism to laterally move said wipers towards each other to a position above the bottle and to thereafter move the slide downwardly to engage the label with said wipers and press it into contact with the bottle.

6. In a bottle labeling machine the combination with a bottle support, of a magazine for holding labels, a picker mechanism for transporting successive labels from the magazine to a stripping position above a bottle on said support, a horizontally and vertically reciprocable grip-finger, means operable in timed relation to the picker mechanism for moving said finger horizontally to a position above the bottle and then vertically downwardly to remove each label from stripping position and locate it on the bottle, a vertically reciprocable wiper support, a pair of wipers horizontally reciprocable on said support, and means operable in timed relation to the picker mechanism to move said wipers towards each other to corresponding positions over the bottle and then to move the support downwardly to smoothly apply the label to the bottle.

7. In a labeling machine the combination with a bottle support, of a picker mechanism for transporting a label to a stripping position above a bottle on said support, a horizontally and vertically reciprocable grip-finger, cam means operable in timed relation to the picker mechanism to move the grip-finger horizontally to a position over the bottle and then vertically downward to remove the label from stripping position and locate it on the bottle, a vertically reciprocable slide having a pair of horizontally disposed guides respectively located at each side of said support, a wiper slidably mounted in each guide, and means operable in timed relation to the grip-finger movement for initially moving the wipers towards each other to adjacent positions over the bottle and thereafter moving the slide downwardly to wipe the label into bottle contact with increasing pressure.

8. In a labeling machine the combination with a bottle support, of a picker mechanism for transporting a label to a stripping position above a bottle on said support, a horizontally and vertically reciprocable grip-finger, cam means operable in timed relation to the picker mechanism for moving the grip-finger horizontally above the bottle and then downwardly to remove the label from stripping position and locate it on the bottle, a vertically reciprocable slide having opposed aligned guides horizontally disposed respectively at each side of the bottle support, a pair of wipers respectively movable in said guides towards and from each other in the same plane, cam means operable in timed relation to the picker mechanism for moving the wipers to predetermined corresponding positions above a label on the bottle, and cam means to thereafter move the slide downwardly for smoothly pressing the label onto the bottle.

HERMAN STAKE.
AXEL W. CARLSON.